(12) United States Patent
Williams, Jr.

(10) Patent No.: US 7,765,183 B2
(45) Date of Patent: Jul. 27, 2010

(54) HIERARCHICAL TREE OF DETERMINISTIC FINITE AUTOMATA

(75) Inventor: John J. Williams, Jr., Pleasanton, CA (US)

(73) Assignee: Cisco Technology, Inc, San Jose, CA (US)

( * ) Notice: Subject to any disclaimer, the term of this patent is extended or adjusted under 35 U.S.C. 154(b) by 658 days.

(21) Appl. No.: 11/113,248

(22) Filed: Apr. 23, 2005

(65) Prior Publication Data

US 2006/0242123 A1  Oct. 26, 2006

(51) Int. Cl.
G06F 17/30    (2006.01)
(52) U.S. Cl. ...................................... 707/601
(58) Field of Classification Search ................. None
See application file for complete search history.

(56) References Cited

U.S. PATENT DOCUMENTS

| | | | |
|---|---|---|---|
| 4,241,402 A | 12/1980 | Mayper et al. | |
| 5,151,950 A * | 9/1992 | Hullender | 382/187 |
| 5,768,423 A * | 6/1998 | Aref et al. | 382/228 |
| 5,796,942 A | 8/1998 | Esbensen | |
| 5,995,963 A * | 11/1999 | Nanba et al. | 707/6 |
| 6,108,782 A | 8/2000 | Fletcher et al. | |
| 6,571,243 B2 * | 5/2003 | Gupta et al. | 707/6 |
| 6,851,061 B1 | 2/2005 | Holland, III et al. | |
| 6,856,981 B2 * | 2/2005 | Wyschogrod et al. | 706/48 |
| 6,892,237 B1 | 5/2005 | Gai et al. | |
| 6,952,694 B2 * | 10/2005 | Mathur et al. | 707/6 |
| 7,072,876 B1 * | 7/2006 | Michael | 706/45 |
| 7,134,143 B2 | 11/2006 | Stellenberg et al. | |
| 7,512,531 B1 * | 3/2009 | Shia | 703/16 |
| 2003/0051043 A1 * | 3/2003 | Wyschogrod et al. | 709/230 |
| 2003/0084328 A1 | 5/2003 | Tarquini et al. | |
| 2003/0110208 A1 * | 6/2003 | Wyschogrod et al. | 709/202 |
| 2003/0233346 A1 * | 12/2003 | Mathur et al. | 707/3 |
| 2004/0123155 A1 | 6/2004 | Etoh et al. | |

(Continued)

OTHER PUBLICATIONS

Ives, Zachary, et al "Efficient Evaluation of Regular Path Expressions on Streaming XML Data," 2000, University of Washington Technical Report, pp. 1-22.*

(Continued)

*Primary Examiner*—Neveen Abel Jalil
*Assistant Examiner*—Farhan M Syed
(74) *Attorney, Agent, or Firm*—The Law Office of Kirk D. Williams

(57) ABSTRACT

A hierarchical tree of deterministic finite automata (DFA) is traversed and/or generated based on a set of regular expressions. The hierarchical DFA includes a root DFA linked together with a set of leaf DFAs, and possibly a set of branch DFAs. The root DFA is always active and is responsive to an input string, as are any currently active branch and leaf DFAs. When a final state or arc is reached or traversed in any active DFA, a regular expression has been matched. The branch and leaf DFAs are activated in response to the root DFA or a branch DFA reaching or traversing an activation state or arc corresponding to the branch or leaf DFA. Active branch and leaf DFAs will become inactive when a termination state or arc is reached or traversed within the branch or leaf DFA. State explosion in the hierarchical DFA can typically be avoided by selectively grouping similar portions of the regular expressions together in branch and leaf DFAs.

15 Claims, 15 Drawing Sheets

U.S. PATENT DOCUMENTS

| | | | |
|---|---|---|---|
| 2005/0010581 A1* | 1/2005 | Doan | 707/100 |
| 2005/0216770 A1 | 9/2005 | Rowett et al. | |
| 2006/0005241 A1* | 1/2006 | Zhao et al. | 726/22 |
| 2006/0077979 A1* | 4/2006 | Dubrovsky et al. | 370/394 |
| 2006/0085533 A1* | 4/2006 | Hussain et al. | 709/223 |
| 2007/0058551 A1 | 3/2007 | Brusotti et al. | |

OTHER PUBLICATIONS

Gu, Zy et al., "The Derivation of Test Cases from SDL Specifications," 1992, ACM Southeast Regional Conference, Proceedings of the 30th Annual Southeast Regional Conference, pp. 219-227.*

M. Barrio, P. de la Fuente, and J. Vegas, *A Recursive Version of the Shift Or Algorithm*, Proceedings of 14TH lasted, lasted Acta Press, 1996, páginas 15-18.

R. Baeza-Yates and G. Gonnet, *A New Approach to Text Searching*, Communications of the ACM, 35(10), pp. 74-82, 1992.

R. Boyer and J. Moore, *A Fast String Searching Algorithm*. Communications of the ACM, 20(10), pp. 762-772, 1977.

Merrill E. Isenman and Dennis E. Shasha, *Performance and Architectural Issues for String Matching*, IEEE Transactions on Computers, vol. 39, No. 2, Feb. 1990, pp. 238-250.

Josue Kuri and Gonzalo Navarro, *Fast Multipattern Search Algorithms for Intrusion Detection*, Proceedings of the Seventh International Symposium on String Processing and Information Retrieval (SPIRE '00), IEEE, 2000, 12 pages.

C. Jason Coit, Stuart Staniford, and Joseph McAlerney, *Towards Faster String Matching for Intrusion Detection or Exceeding the Speed of Snort*, Proceedings of the DARPA Information Survivability Conference and Exposition (DISCEXII '01), IEEE, 2001, 7 pages.

Peter C. Wayner, *Using Content-Addressable Search Engines to Encrypt and Break DES*, Computer Science Department, Cornell University, 1991, 11 pages.

U.S. Appl. No. 10/340,392, filed Jan. 10, 2003, Panigraphy et al.

* cited by examiner

```
                       262 264                  265              266
           260 ↘        263 ↓                    ↓               ↓ 267
                        ↓ ↓ ↓                    ↓               ↓ ↓

PATTERN (261):     a b c d a b c d e a b c d e f a b c d e f g
ROOT DFA (250):    0 1 3 5 6 1 3 5 6 0 1 3 5 6 0 0 1 3 5 6 0 0 0
DFA (220):             0 1     0 1 2     0 1 2 3     0 1 2 3
DFA (240):               0       0 1       0 1 2       0 1 2 3
```

HIERARCHICAL TREE OF DETERMINISTIC FINITE AUTOMATA

TECHNICAL FIELD

One embodiment of the invention relates to communications and computer systems, especially computers, routers, packet switching systems, and other devices; and more particularly, one embodiment relates to a hierarchical tree of deterministic finite automata.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Regular expression matching is becoming a common operation to be performed at high speeds. For example, URLs may need to be located in Layer 7 (L7) packet headers only if they match a set of regular expressions to classify the sessions appropriately. Similarly, regular expression matching is used for intrusion detection, security screening (e.g., whether an email or other message contains certain patterns of keywords), load balancing of traffic across multiple servers, and array of many other applications.

A problem, especially for high speed applications, is the rate at which matching can be performed, as well as the space required to store the match identification data structure. A common method to match common expressions is to convert them to a deterministic finite automaton (DFA). The use of DFAs for regular expression matching which produces a set of matched regular expressions upon reaching a final state is well-known. From one perspective, a DFA is a state machine which processes each character of an input string, and upon reaching a final state, generates a list of one or more matched regular expressions. The memory requirements and speed at which these DFAs may be traversed may not meet the needs of certain applications, especially some high-speed applications.

For example, if multiple regular expressions are to be simultaneously matched against, then the DFAs for the different regular expressions typically are multiplied to get a single DFA for the entire collection. However, multiplying DFAs together can generate an exponential number of states, thus making it impractical for certain applications. Individual DFAs could be simultaneously checked, however such an approach requires that the state for each DFA be updated for each character processed. For each character in the string this could mean a large number of memory accesses, one for each DFA. Alternatively, the DFAs could be multiplied together to form a combined DFA.

Traditional literature discusses nondeterministic finite automata (NFAs) and DFAs with the intent of producing a single DFA. Indeed, most approaches to the problem have involved compiling separate and disjunctive sets of regular expressions into DFAs. Here there tend to be two extremes. First, for a purely table driven approach, the largest DFAs are constructed and run in parallel. Second, a recent hardware accelerated approach is to create many smaller DFAs and run those in parallel. What these approaches share in common is that they perform the partitioning at the regular expression level. A DFA represents sets of whole and entire regular expressions. This produces the deterministic property, but also adds greatly to the resources necessary to implement such a partitioning of the problem space, either an excessive table footprint, or many processors running in parallel.

SUMMARY OF THE INVENTION

Disclosed are, inter alia, methods, apparatus, data structures, computer-readable media, and mechanisms, for processing and/or generating a hierarchical tree of deterministic finite automata. A hierarchical tree of deterministic finite automata (DFA) is traversed and/or generated based on a set of regular expressions. The hierarchical DFA includes a root DFA linked together with a set of leaf DFAs, and possibly a set of branch DFAs. The root DFA is always active and is responsive to an input string, as are any currently active branch and leaf DFAs. When a final state or arc is reached or traversed in any active DFA, a regular expression has been matched. The branch and leaf DFAs are activated in response to the root DFA or a branch DFA reaching an activation state or arc corresponding to the branch or leaf DFA. Active branch and leaf DFAs will become inactive in response to a termination state or arc being reached or traversed within the branch or leaf DFA. State explosion in the hierarchical DFA can typically be avoided by selectively grouping similar portions of the regular expressions together in branch and leaf DFAs.

One embodiment processes a hierarchical deterministic finite automata (DFA) produced from a plurality of regular expressions, with the hierarchical DFA including a root DFA and one or more leaf DFAs. Each character of a string of characters on which to perform matching is processed in the root DFA and in each active leaf DFA. This processing typically includes: determining a next state; and in response to the next state or arc being a final state or arc, indicating a match for the corresponding regular expression. This processing in each active particular leaf DFA typically also includes: in response to the next state being a terminating state or traversing a terminating arc, making the corresponding leaf DFA inactive. This processing in the root DFA also includes: in response to the next state being an activation state or traversing an activation arc, activating one of the leaf DFAs as required. One embodiment also includes one or more branch DFAs, which are similar to leaf DFAs, but the branch DFAs can also activate another branch DFA or a leaf DFA.

One embodiment generates the hierarchical DFA, which typically includes determining a root DFA based on at least one beginning character from each of the regular expressions. The leaf DFAs and possibly branch DFAs are determined for corresponding to portions of the regular expressions following these one or more beginning characters. The root DFA and these leaf and possibly branch DFAs are linked together in a manner in order to identify when to activate each of these leaf and possibly branch DFAs, with the leaf and branch DFAs including at least one final state or arc, and at least one termination state or arc.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
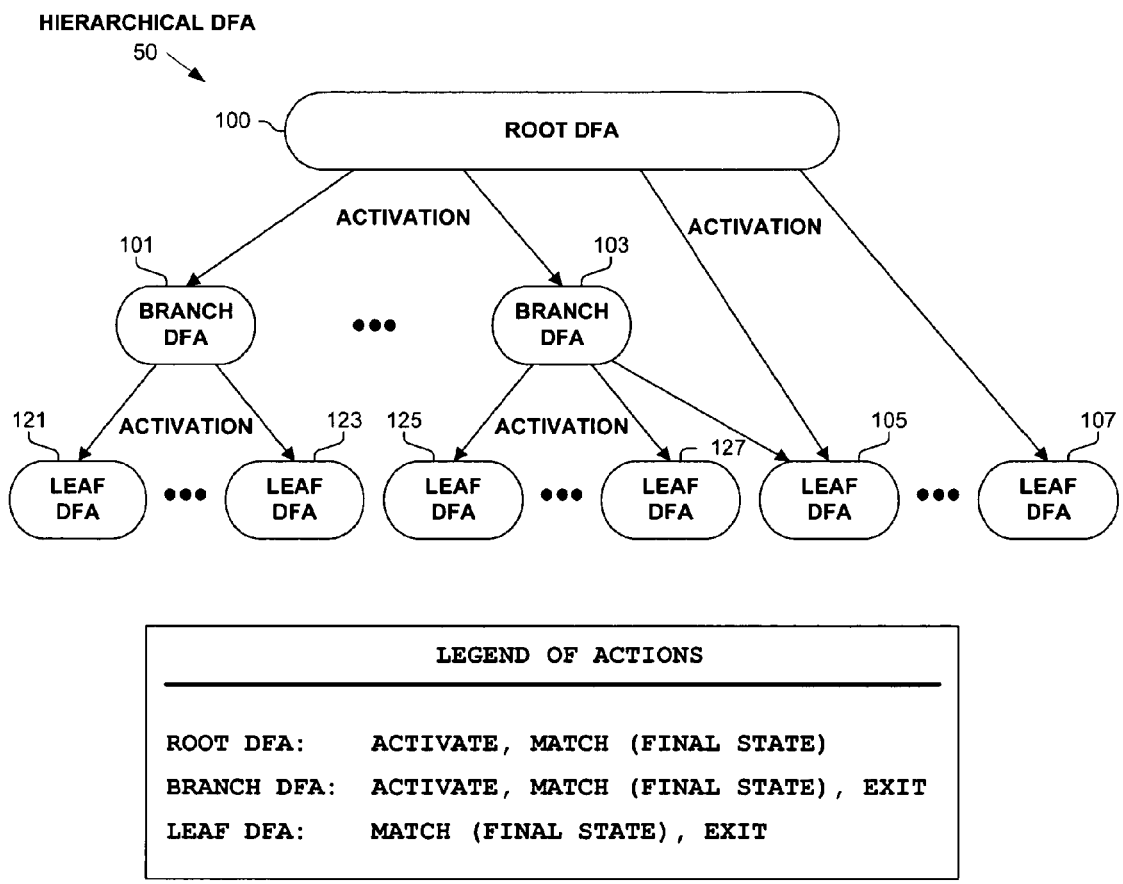
FIG. 1 is a block diagram illustrating a hierarchical DFA traversed in and/or generated by one embodiment.

Disclosed are, inter alia, methods, apparatus, data structures, computer-readable media, and mechanisms, for processing and/or generating a hierarchical tree of deterministic finite automata. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for processing and/or generating a hierarchical tree of deterministic finite automata. A hierarchical tree of deterministic finite automata (DFA) is traversed and/or generated based on a set of regular expressions. The hierarchical DFA includes a root DFA linked together with a set of leaf DFAs, and possibly a set of branch DFAs. The root DFA is always active and is responsive to an input string, as are any currently active branch and leaf DFAs. When a final state or arc is reached or traversed in any active DFA, a regular expression has been matched. The branch and leaf DFAs are activated in response to the root DFA or a branch DFA reaching an activation state or arc corresponding to the branch or leaf DFA. Active branch and leaf DFAs will become inactive in response to a termination state or arc being reached or traversed within the branch or leaf DFA. State explosion in the hierarchical DFA can typically be avoided by selectively grouping similar portions of the regular expressions together in branch and leaf DFAs.

One embodiment processes a hierarchical deterministic finite automata (DFA) produced from a plurality of regular expressions, with the hierarchical DFA including a root DFA and one or more leaf DFAs. Each character of a string of characters on which to perform matching is processed in the root DFA and in each active leaf DFA. This processing typically includes: determining a next state; and in response to the next state or arc being a final state or arc, indicating a match for the corresponding regular expression. This processing in each active particular leaf DFA typically also includes: in response to the next state being a terminating state or traversing a terminating arc, making the corresponding leaf DFA inactive. This processing in the root DFA also includes: in response to the next state being an activation state or traversing an activation arc, activating one of the leaf DFAs as required. One embodiment also includes one or more branch DFAs, which are similar to leaf DFAs, but the branch DFAs can also activate another branch DFA or a leaf DFA.

One embodiment generates the hierarchical DFA, which typically includes determining a root DFA based on at least one beginning character from each of the regular expressions. The leaf DFAs and possibly branch DFAs are determined for corresponding to portions of the regular expressions following these one or more beginning characters. The root DFA and these leaf and possibly branch DFAs are linked together in a manner in order to identify when to activate each of these leaf and possibly branch DFAs, with the leaf and branch DFAs including at least one final state or arc, and at least one termination state or arc.

One embodiment processes a hierarchical deterministic finite automata (DFA) produced from multiple regular expressions, with the hierarchical DFA including a root DFA and one or more leaf DFAs. One embodiment includes means for traversing the hierarchical DFA in response to a sequence of characters and for identifying matches to one or more of said regular expressions, with this means for traversing the hierarchical DFA includes means for traversing the root DFA and for activating the leaf DFAs in response to reaching or traversing corresponding one or more activation states or arcs within the root DFA.

In one embodiment, each of the leaf DFAs includes a terminating state or arc; wherein the means for traversing the hierarchical DFA including means for terminating the traversing of a particular one of the leaf DFAs when a corresponding terminating state or arc is reached or traversed in the particular one of the leaf DFAs. In one embodiment, the root DFA is always active and each of the leaf DFAs is intermittently active. In one embodiment, the hierarchical DFA includes one or more branch DFAs; wherein each of the branch DFAs includes an activation state or arc for causing activation of at least one of the leaf DFAs. In one embodiment, each of the leaf DFAs and the branch DFAs includes a terminating state or arc; wherein the means for traversing the hierarchical DFA includes means for terminating the traversing of a particular one of the leaf DFAs and the branch DFAs when a corresponding terminating state or arc is reached or traversed in the particular one of the leaf DFAs and the branch DFAs. In one embodiment, the root DFA is always active and each of the branch DFAs and leaf DFAs is intermittently active.

One embodiment processes a hierarchical deterministic finite automata (DFA) produced from multiple regular expressions, with the hierarchical DFA including a root DFA and one or more leaf DFAs. Each character of a string of characters on which to perform matching is processed in the root DFA and in each particular active leaf DFA of the leaf DFAs, which typically includes: determining a next state; and in response to the next state being a final state or traversing a final arc, indicating a match for the corresponding regular expression. The processing of the each active particular leaf DFA also includes: in response to the next state being a terminating state or traversing a terminating arc in the particular leaf DFA, making the particular leaf DFA inactive. The processing of the root DFA also includes: in response to the next state being an activation state or traversing an activation arc, activating one of the leaf DFAs.

In one embodiment, activating one of the leaf DFAs is performed only if the one of the leaf DFAs is currently inactive. One embodiment includes generating the hierarchical DFA, which typically includes: determining the root DFA based on at least one beginning character from each of the regular expressions; and determining the leaf DFAs corresponding to portions of the regular expressions following these beginning characters and linking each of the leaf DFAs to the root DFA to identify when to activate the each of the leaf DFAs, the each of the leaf DFAs including at least one final state and at least one termination state One embodiment processes a hierarchical deterministic finite automata (DFA) produced from multiple regular expressions, with the hierarchical DFA including a root DFA, one or more branch DFAs, and one or more leaf DFAs. Each character of a string of characters on which to perform matching is processed in the root DFA and in each particular active branch DFA and in each particular active leaf DFA. This processing typically includes: determining a next state; and in response to the next state being a final state, indicating a match for the corresponding regular expression of the regular expressions. The processing of the each active particular leaf DFA typically also includes in response to the next state being a terminating state or traversing a terminating arc in the particular leaf DFA, making the particular leaf DFA inactive. The processing of the each active particular branch DFA typically also includes: in response to the next state being a terminating state or traversing a terminating arc in the particular branch DFA, making the particular branch DFA inactive. The processing of the each active particular branch DFA typically also includes: in response to the next state being an activation state or traversing an activation arc, activating one of the branch or leaf DFAs. The processing of the root DFA typically also includes: in response to the next state being an activation state or traversing an activation arc, activating one of the branch or leaf DFAs.

In one embodiment, activating one of the branch or leaf DFAs is performed only if the one of the branch or leaf DFAs is currently inactive. One embodiment includes generating the hierarchical DFA, which typically includes: determining a root DFA based on the beginning one or more characters of each of the regular expressions; and determining the branch DFAs and the leaf DFAs corresponding to portions of the regular expressions following these beginning characters and linking each of the branch DFAs and the leaf DFAs to the root DFA to identify when to activate the each of the branch DFAs and the leaf DFAs, the each of the branch DFAs and the leaf DFAs including at least one final state or arc and at least one termination state or arc.

One embodiment produces a hierarchical deterministic finite automata (DFA) from multiple regular expressions, which typically includes: determining a root DFA based on the beginning one or more characters of each of the regular expressions; and determining one or more leaf DFAs corresponding to m characters immediately following these beginning characters of at least one of the regular expressions and linking each of the leaf DFAs to the root DFA in such a manner as to identify when to activate the each of the leaf DFAs, the each of the leaf DFAs including at least one final state and at least one termination state.

One embodiment produces a hierarchical deterministic finite automata (DFA) from multiple regular expressions, which typically includes: determining a root DFA based on the first n characters of each of the regular expressions; and determining one or more branch DFAs and one or more leaf DFAs corresponding to one or more characters immediately following the beginning one or more characters of at least one of the regular expressions and linking each of the branch DFAs and the leaf DFAs to the root DFA to identify when to activate the each of the branch DFAs and the leaf DFAs, the each of the branch DFAs and the leaf DFAs including at least one final state or arc and at least one termination state or arc.

One embodiment produces a hierarchical deterministic finite automata (DFA) from multiple regular expressions, which typically includes: determining a root DFA based on the beginning one or more characters of each of the regular expressions; and determining one or more leaf DFAs corresponding to portions of the regular expressions following these beginning characters and linking each of the leaf DFAs to the root DFA to identify when to activate the each of the leaf DFAs, the each of the leaf DFAs including at least one final state or arc and at least one termination state or arc.

One embodiment produces a hierarchical deterministic finite automata (DFA) from multiple regular expressions, which typically includes: determining a root DFA based on the beginning one or more characters of each of the regular expressions; and determining one or more branch DFAs and one or more leaf DFAs corresponding to portions of the regular expressions following these beginning characters and linking each of the branch DFAs and the leaf DFAs to the root DFA to identify when to activate the each of the branch DFAs and the leaf DFAs, the each of the branch DFAs and the leaf DFAs including at least one final state and at least one termination state.

In one embodiment, the final state and the termination state are the same state or the final arc and the termination arc are the same arcs in at least one of the branch DFAs and the leaf DFAs. In one embodiment, the final state and the termination state are different states or the final and termination arcs are different arcs in at least one of the branch DFAs and the leaf DFAs.

One embodiment significantly reduces the resource requirements by having a hierarchical DFA structure where most branch and child DFAs are idle and are triggered into their starting state from their respective parent DFA (i.e., the root DFA or one of the branch DFAs). The root DFA represents the starting state and is always running. Depending on what patterns are recognized, it can trigger child DFAs (i.e., branch DFAs, leaf DFAs) to further examine a string that contains a match at the beginning of the regular expression.

In one embodiment, the root DFA is always active, switching state arcs according to input bytes, and typically represents the beginning patterns of all the regular expressions being represented in the tree. It can be expected to have a dense arc space, meaning it can be expected to have many unique arcs going to next states from any particular state. The fact that it typically encompasses the entirety of all the starting states from all the regular expressions determines how dense the arc transitions from each state are.

In addition to a next state for each arc, there may also be a list of child DFAs that are triggered (i.e., activated) by arc. If the patterns seen thus far matches the beginning of a regular expression, the next child DFA containing the representation for that regular expression is triggered. At any time, there is a list of child DFAs that are to be run in parallel to the root DFA. The reason the algorithm is non deterministic is because the number of DFAs running in parallel depends on the stream being evaluated.

It is also possible that a short regular expression will be contained completely within the root DFA, so matching signals may come from state arcs as well.

Branch DFAs are similar to root DFAs with two possible exceptions. First, they are only run after they have been triggered. They may also have state arcs that terminate with no matching signal, such as when the regular expression match is impossible without going through the starting states (the root DFA) again.

The arc space from each state may be considerably more sparse. This is a property that can be exploited in compressing the state arc space considerably without incurring performance penalties.

Leaf DFAs are similar to branch DFAs except that no further leaf DFAs can be triggered. Again, the search has narrowed considerably, the state arc space is considerably more sparse. There is less probability of leaf DFAs being triggered unless a significant portion of the beginning of a regular expression(s) has been matched so far.

The way in which this technique scales with the size of the problem space is its primary strength. First, for small enough sets of regular expressions, compiling everything into one large DFA can be considered the equivalent of having only the root DFA with no branch or leaf DFAs. Once the unified DFA expands beyond a certain acceptable size, there is increased interest in looking at methods for searching in parallel. One brute force technique is simply to partition the regular expressions into separate DFAs and run the resultant DFAs in parallel. This can be referred to as horizontal partitioning, as it is taking a list of regular expressions and partitioning them into sets of regular expressions.

Another way of partitioning that is used with the hierarchical technique is vertical partitioning. This involves creating a DFA from the beginning segments of all the regular expressions, a vertical slice down the list of regular expressions. The remaining segments may then become separate branch or leaf DFAs.

The branch and leaf DFAs differ from traditional DFAs in that they do not include the starting states. Remember that the starting states are represented in the root DFA. Instead of including the starting states, there are trigger arcs from the root DFA that start the child DFA at particular states. Also, instead of having arcs that go back to the starting states of the child DFA, which are not represented in the child DFA, the arcs exit the DFA without producing a term (that a regular expression has been matched). If there is another starting sequence for that child DFA, the root DFA recognizes it and triggers the child DFA again.

It can be seen that child DFAs pop in and out of activation, popping in when triggered by a parent DFA, and popping out if the child takes an exit arc.

There are various levels of optimization that can occur depending on the resources available and the number and type of regular expressions to be evaluated. A large root DFA can be constructed if there is plenty of memory. A small root DFA can be constructed if there is plenty of processing power. One possible optimization is to make sure there is at most one triggered child from any parent arc.

An added benefit of having child DFAs is that the arc space is generally much more sparse. This allows for a significant amount of compression in the arc space. A large DFA might have a unique arc for each and every possible byte. A smaller DFA might only have a few unique arcs. Most of the arcs would be exit arcs, where it would be impossible to match after a certain symbol (without going through the starting states again). There are several ways a sparsely populated state could be represented.

For example, a sparse state with few unique arcs could be represented in pure code as branch statements, or a switch statement in C. It could be represented as some n-ary tree or list populated with expressions specifying match criteria for each unique arc.

It is possible that there is more than one arc from a root DFA to any given leaf DFA. This may be because there are a number of root DFA states that have a start state for a leaf DFA, or there may be multiple starting states for the leaf DFA. Once a leaf DFA is triggered it will continue to execute until reaching an exit arc. If a leaf DFA is executing and an additional start state is triggered, that additional start state is ignored because the superposition of states is already taken into account by the leaf DFA.

Turning to the figures, FIG. 1 is a block diagram illustrating a hierarchical DFA 50 traversed in and/or generated by one embodiment. As shown, DFA 50 includes a root DFA 100, multiple branch DFAs 101-103, and multiple leaf DFAs 121-127 (activated by branch DFAs 101-103) and leaf DFAs 105-107 (activated by root DFA 100). The number of branch and leaf DFAs will typically vary among embodiments in based on the original regular expressions. Note, a root DFA will activate its immediate children DFAs and possibly produce a match indication; a branch DFA will activate its immediate children DFAs, terminate itself (i.e., become inactive), and possibly produce a match indication; and a leaf DFA will terminate itself (i.e., become inactive) and possibly produce a match indication.

FIGS. 2A-G are block diagrams illustrating an example of the generation and traversal of a hierarchical DFA for the two regular expressions "abcdef" and "bcdefg". It is well known in the art how to generate a standard DFA for multiple regular expressions.

Figure 2A:
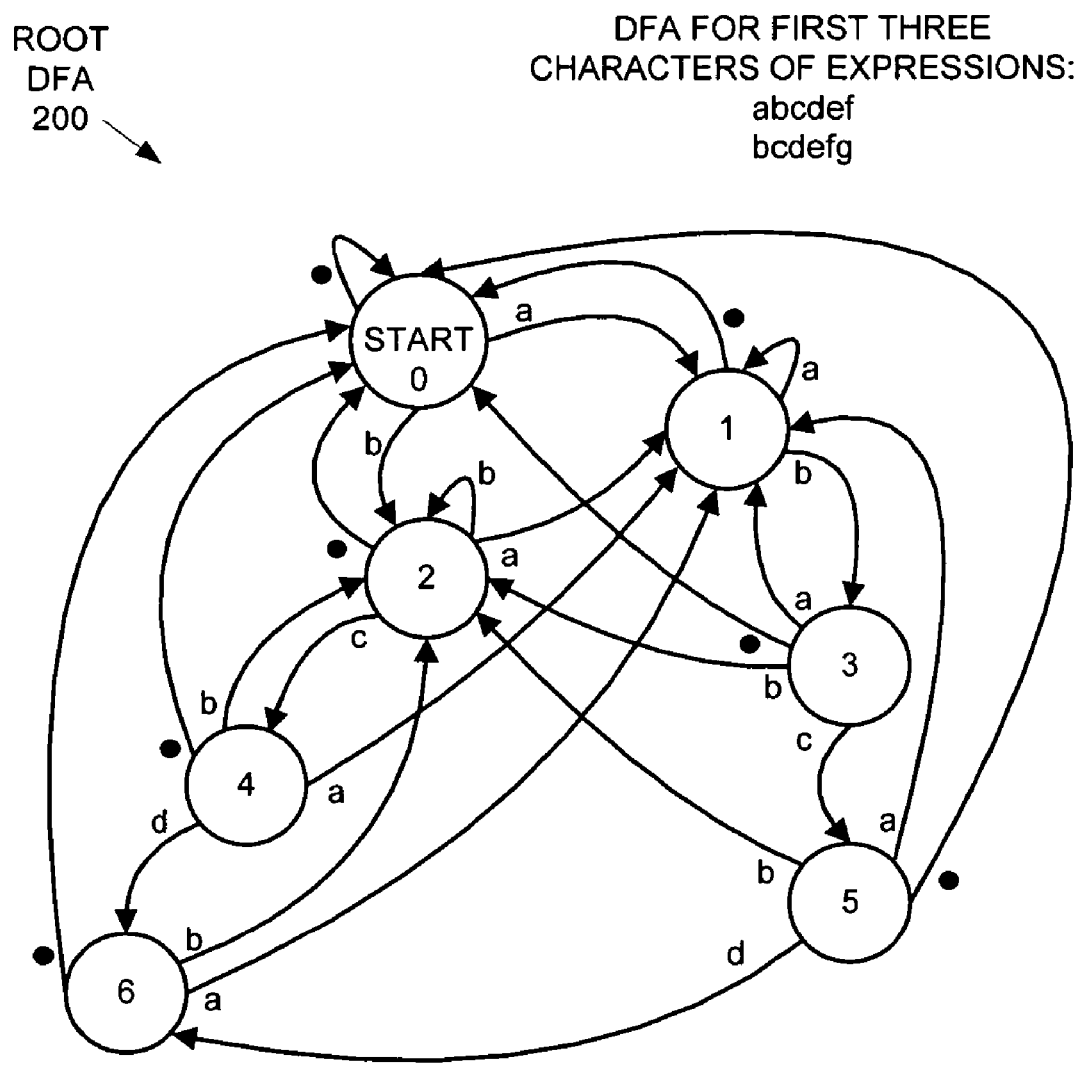
FIGS. 2A-G are block diagrams illustrating an example of the generation and traversal of a hierarchical DFA.

FIG. 2A illustrates root DFA 200 generated from the first three characters of these two regular expressions (with a '.' period representing any other character than that specified by another arc), or in other words, the DFA for the two regular expressions "abc" and "bcd".

Figure 2B:
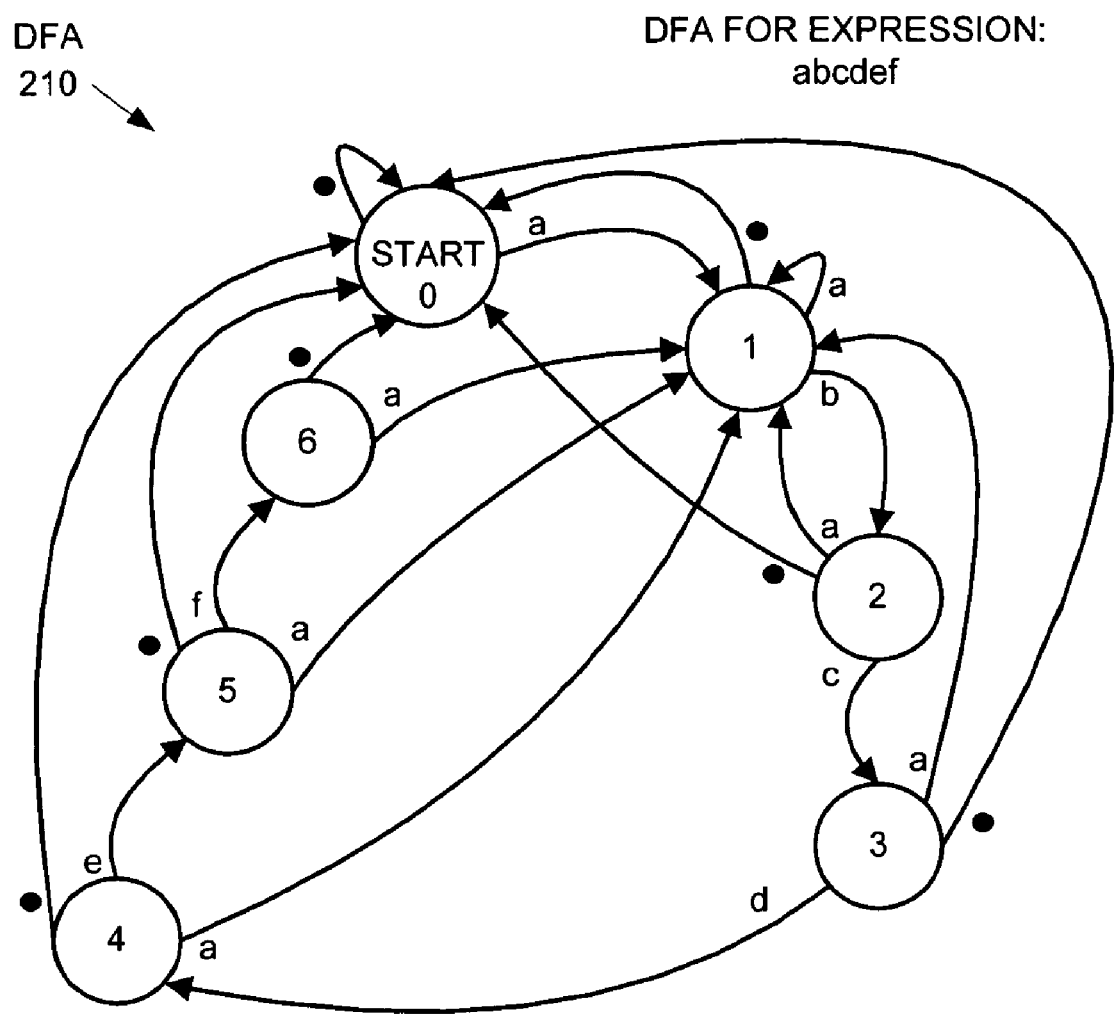

FIG. 2B illustrates DFA 210 generated from the first regular expression "abcdef".

Figure 2C:
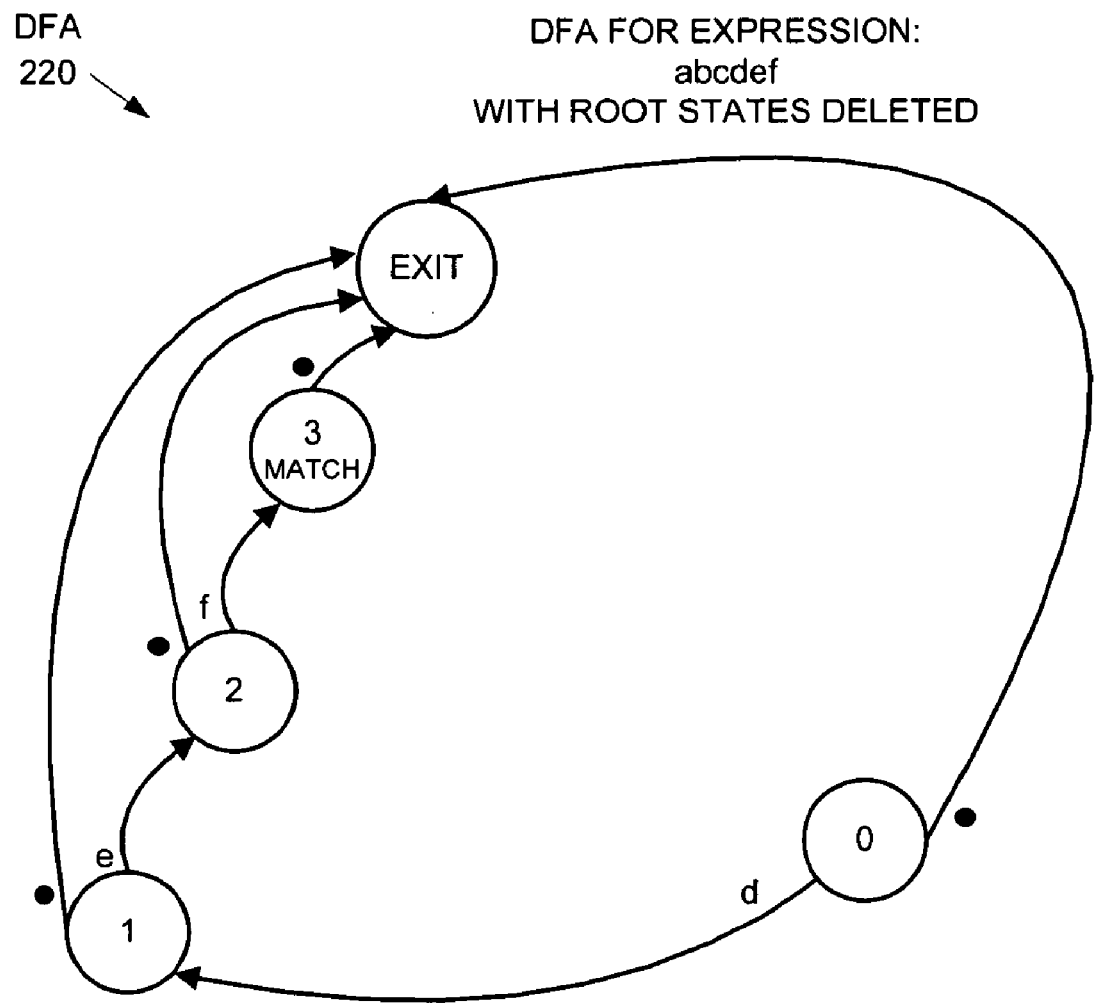

FIG. 2C illustrates DFA 220, which is generated based on DFA 210 (FIG. 2B) with the corresponding states also represented in DFA 200 (FIG. 2A) removed and an exit or terminating state and final or matching state added. (Note that the state names may change among figures.)

Also, note that the terms "final state" or "final arc" refers to a state/arc where a match to a regular expression is identified, and a corresponding child DFA may or may not immediately terminate after reaching a final state or traversing the final arc.

Figure 2D:
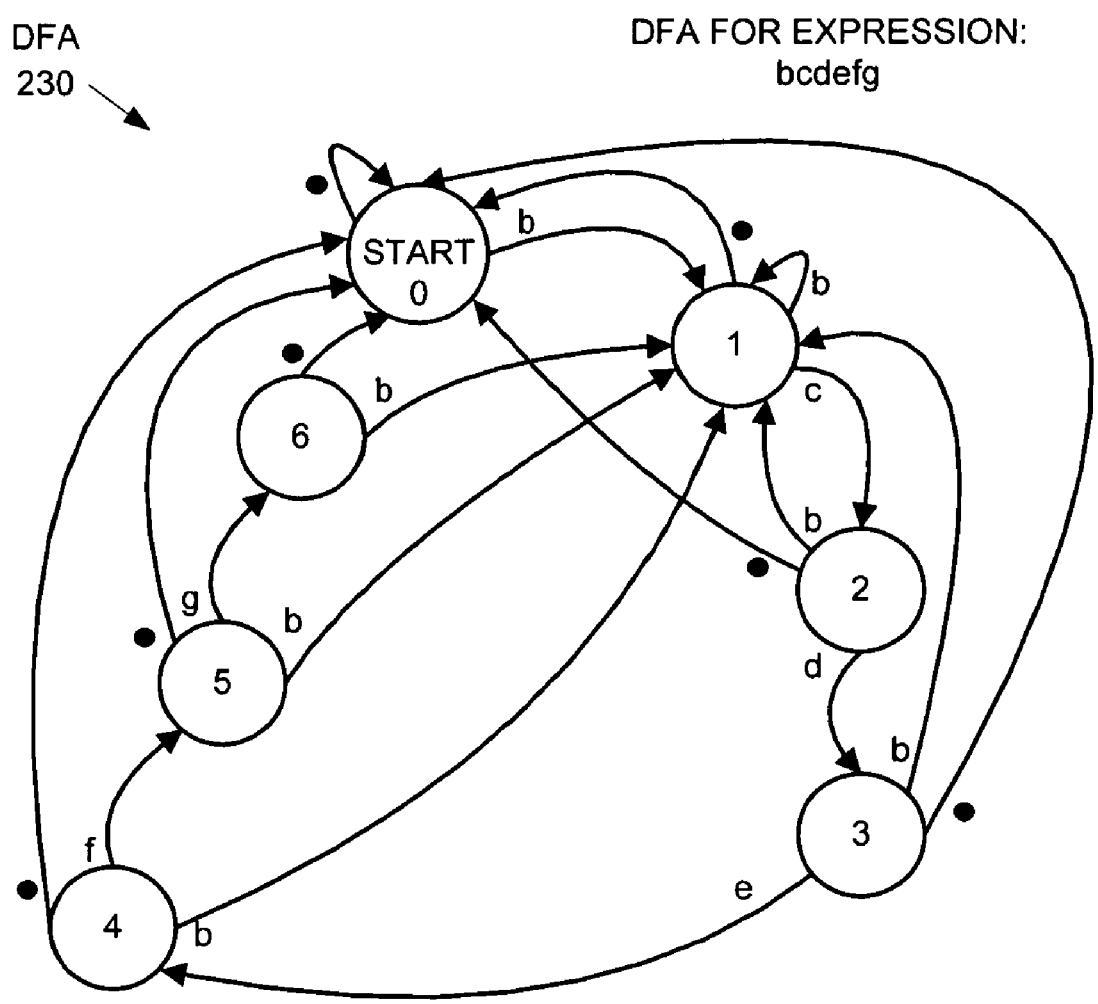

FIG. 2D illustrates DFA 230 generated from the first regular expression "bcdefg".

Figure 2E:
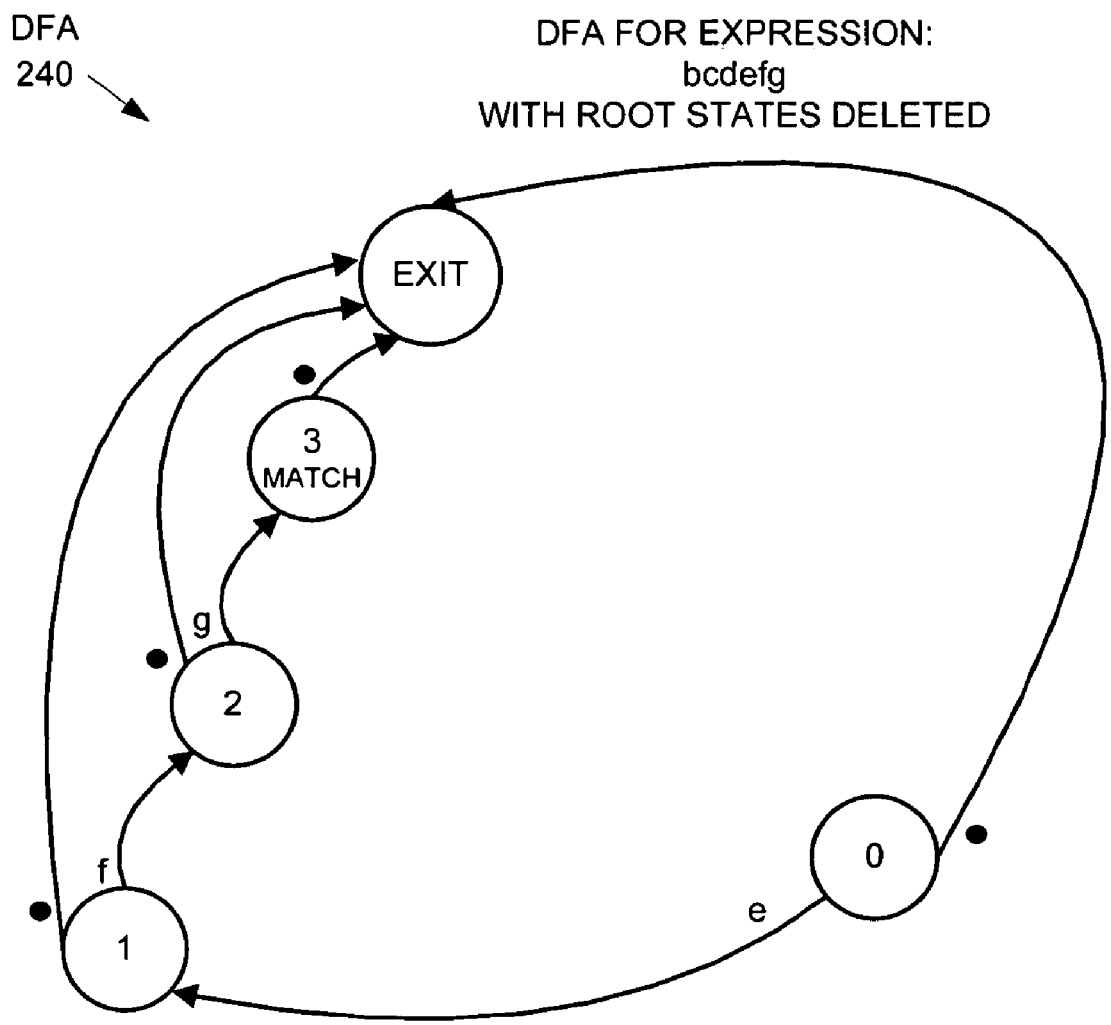

FIG. 2E illustrates DFA 240, which is generated based on DFA 230 (FIG. 2D) with the corresponding states also represented in DFA 200 (FIG. 2A) removed and an exit or terminating state added.

Figures 2F, 2G:
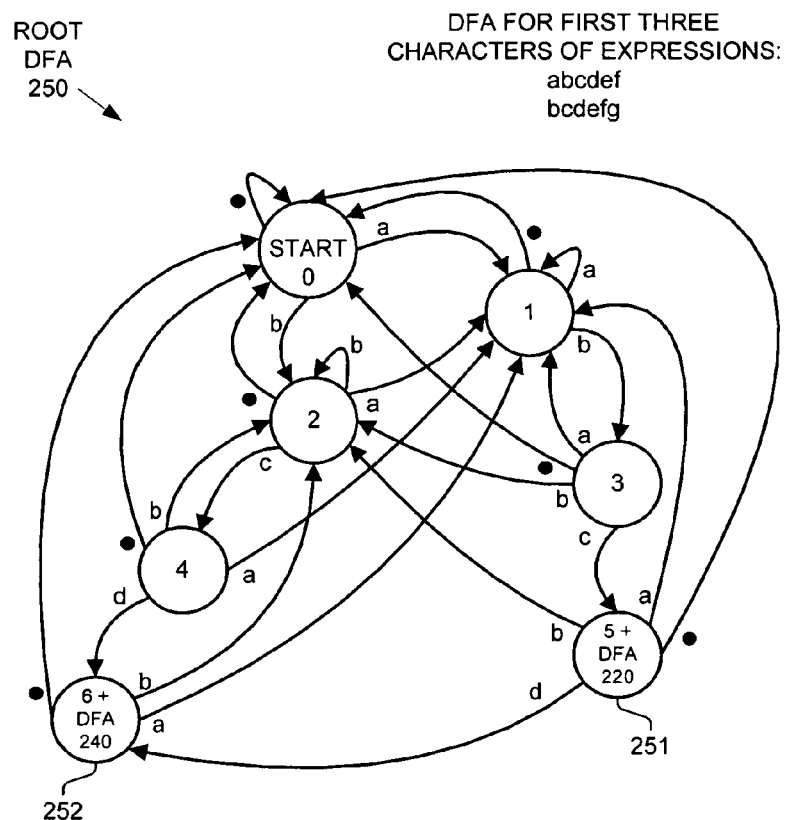

FIG. 2F illustrates root DFA 250 which corresponds to root DFA 210 with state 251 modified to indicate to activate DFA 220 (FIG. 2C) when reached and state 252 modified to indicate to activate DFA 240 (FIG. 2E) when reached. (Note that one embodiment equivalently activates and/or terminates child DFAs based on arcs rather than the states themselves). Thus, DFAs 220 and 240 are linked to root DFA 250.

FIG. 2F illustrates the processing 260 of an input pattern 261 by DFA 250 (FIG. 2F), DFA 220 (FIG. 2C), and DFA 240 (FIG. 2E), and their respective state identification numbers. As shown at 262, leaf DFA 220 becomes active, and at 263, leaf DFA 240 becomes active. Based on the input string and the traversal within leaf DFAs 220 and 240, they both become inactive at 264. Note, based on the pattern of input string 261, DFA 220 and DFA 240 each becomes active four times. As shown, leaf DFA 220 (corresponding to the regular expression "abcdef") matches the pattern of the input string 261 twice (at 265 and 267), and leaf DFA 240 (corresponding to the regular expression "bcdefg") matches the pattern of the input string 261 once (at 267). DFA 220 and DFA 240 exit without indicating a match the other times in which they are active.

Figure 3:
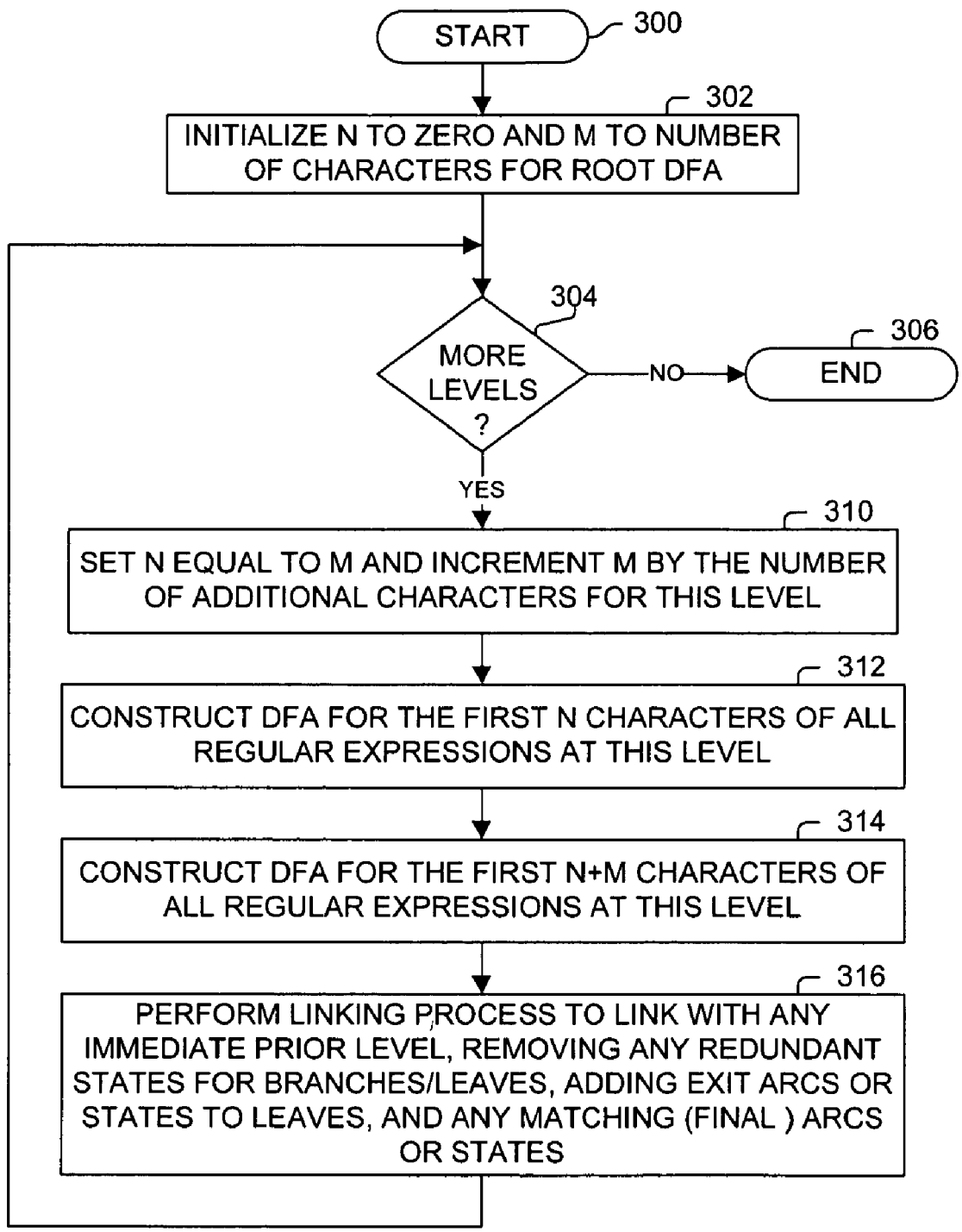
FIG. 3 is a flow diagram illustrating a process used in one embodiment to generate a hierarchical DFA.

FIG. 3 is a flow diagram illustrating a process used in one embodiment to generate a hierarchical DFA. Note, this process demonstrates that a fixed number of characters can be used for each DFA; while in one embodiment uses a different strategy to group portions of regular expressions which are combined together (e.g., as depicted by the various groupings shown in FIG. 4). Processing of the flow diagram of FIG. 3 begins at process block 300, and proceeds to process block 302, wherein the variable N is initialized to zero and the variable M is initialized to the number of characters of each regular expression to be covered in the root DFA. As determined in process block 304, while there are more levels (e.g., branch DFAs or leaf DFAs to generate): in process block 310, N is set equal to M, and M is incremented by the number of additional characters at the current level. In process block 312, a DFA is constructed for the first N characters of all regular expressions having values at this level (and if it is the root DFA, any final/matching states or arcs are so marked). In process block 314, a DFA is constructed for the first N+M characters of all regular expressions having values at this level. Then, in process block 316, the linking process is performed to link the N+M DFA with its immediate prior level DFA, while removing any redundant states for the branch or leaf DFA being created and adding exit arcs or states to leaves and branches, and any matching final arcs or states. Processing returns to process block 304. When processing is complete as determined in process block 304, processing ceases as indicated by process block 306.

In one embodiment, the processing of the flow diagram of FIG. 3 is used to produce that shown and described in conjunction to FIGS. 2A-2E.

In one embodiment, a recursive approach is used in the linking processes between a parent and child DFA. In order to discover the redundant states in the two DFAs, the two DFAs are traversed with redundant states being marked as such. Starting at the start state of each DFA, the start state of the child DFA is marked as redundant. Recursively following the arcs for each arc in the child DFA, if there is a corresponding arc in the parent DFA, then the new state is marked as redundant in the child DFA. After the marking phase has been performed, states in the child DFA that are redundant and have arcs to non-redundant states correspond to activation states in the parent DFA. Any redundant state are removed from the child DFA and any arc to a deleted state becomes a termination arc to cause the child DFA to go in a termination/inactive state.

Figure 4:
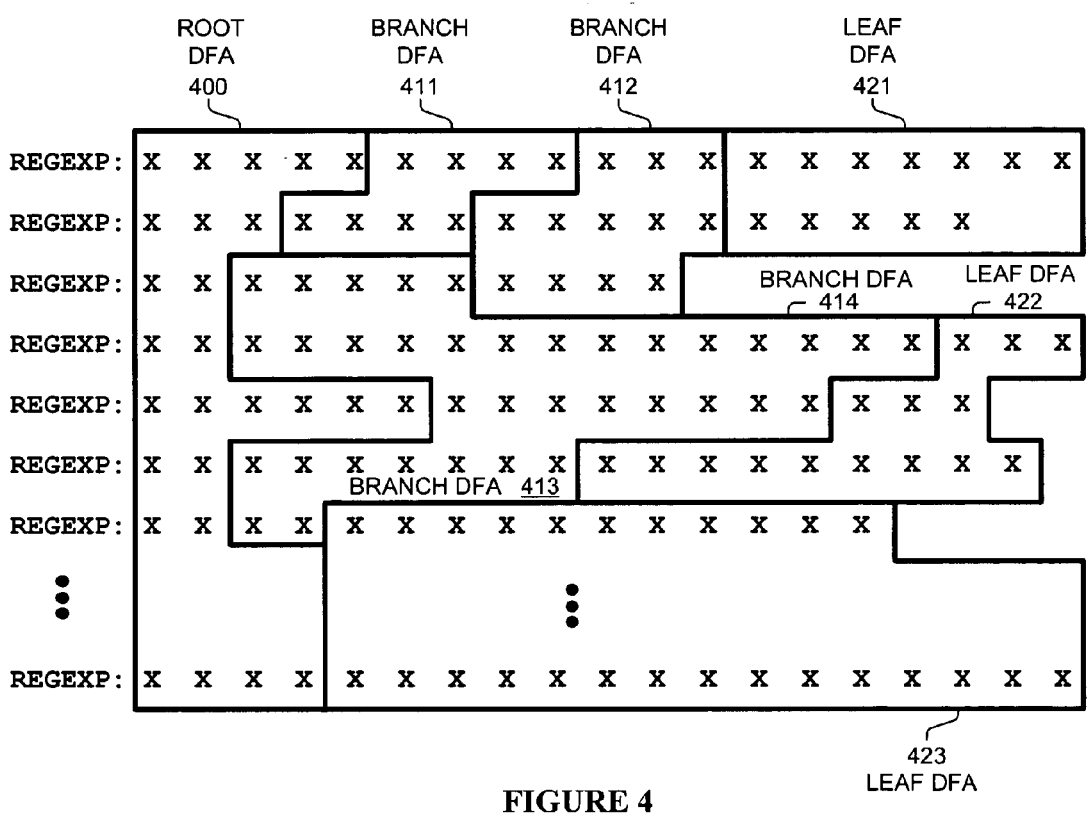
FIG. 4 is a block diagram illustrating a partitioning of a set of regular expressions into a root DFA, branch DFAs, and leaf DFAs.

FIG. 4 is a block diagram illustrating a partitioning of a set of regular expressions into a root DFA 400, branch DFAs 411-414, and leaf DFAs 421-423. One embodiment automatically defines the portions of the regular expressions to be combined into a single DFA; while one embodiment performs this operation interactively or it is performed manually. By grouping portions of related regular expressions together it is typically possible to avoid DFA state explosion. As illustrated herein, the groupings of portions of DFAs can be at regular intervals or variable in nature, such as to exploit the commonality of portions of the regular expressions being processed, with these groupings of portions of regular expressions possibly (and typically) varying to match the particular regular expressions being processed.

Figure 5:
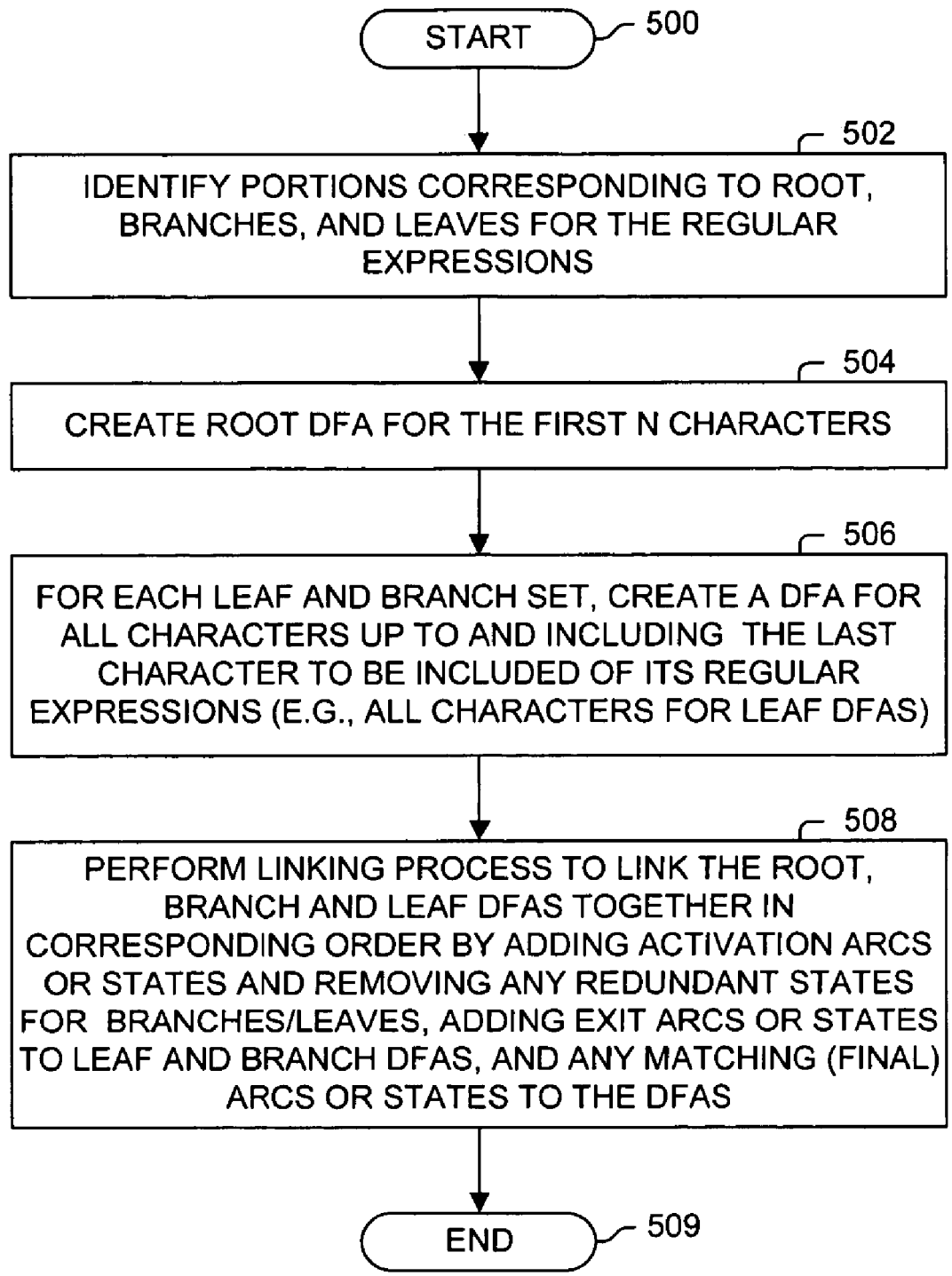
FIG. 5 is a flow diagram illustrating a process used in one embodiment to generate a hierarchical DFA.

FIG. 5 is a flow diagram illustrating a process used in one embodiment to generate a hierarchical DFA. Processing begins at process block 500, and proceeds to process block 502, wherein the portions of the regular expressions which correspond to the root DFA and each of the branch DFAs (if any) and the leaf DFAs. In process block 504, the root DFA is created based on the identified corresponding portion of the regular expression, which is typically (but not always) a fixed number of the first characters of each regular expression. In process block 506, for each leaf and branch set (portion), a DFA is created for all characters up to and including the last character to be included for each of its identified corresponding regular expressions (which for a leaf portion includes all the remaining characters of a regular expression). In process block 508, the linking process is performed to link the root DFA, the branch DFA(s) (if any), and the child DFA(s) together in the corresponding order by adding activation states or arcs, and removing any redundant states from the branch and leaf DFAs, adding exit arcs or states to the leaf and branch DFAs, and adding any final (matching) arcs or states to the DFAs. Processing is complete as indicated by process block 509.

Figure 6A:
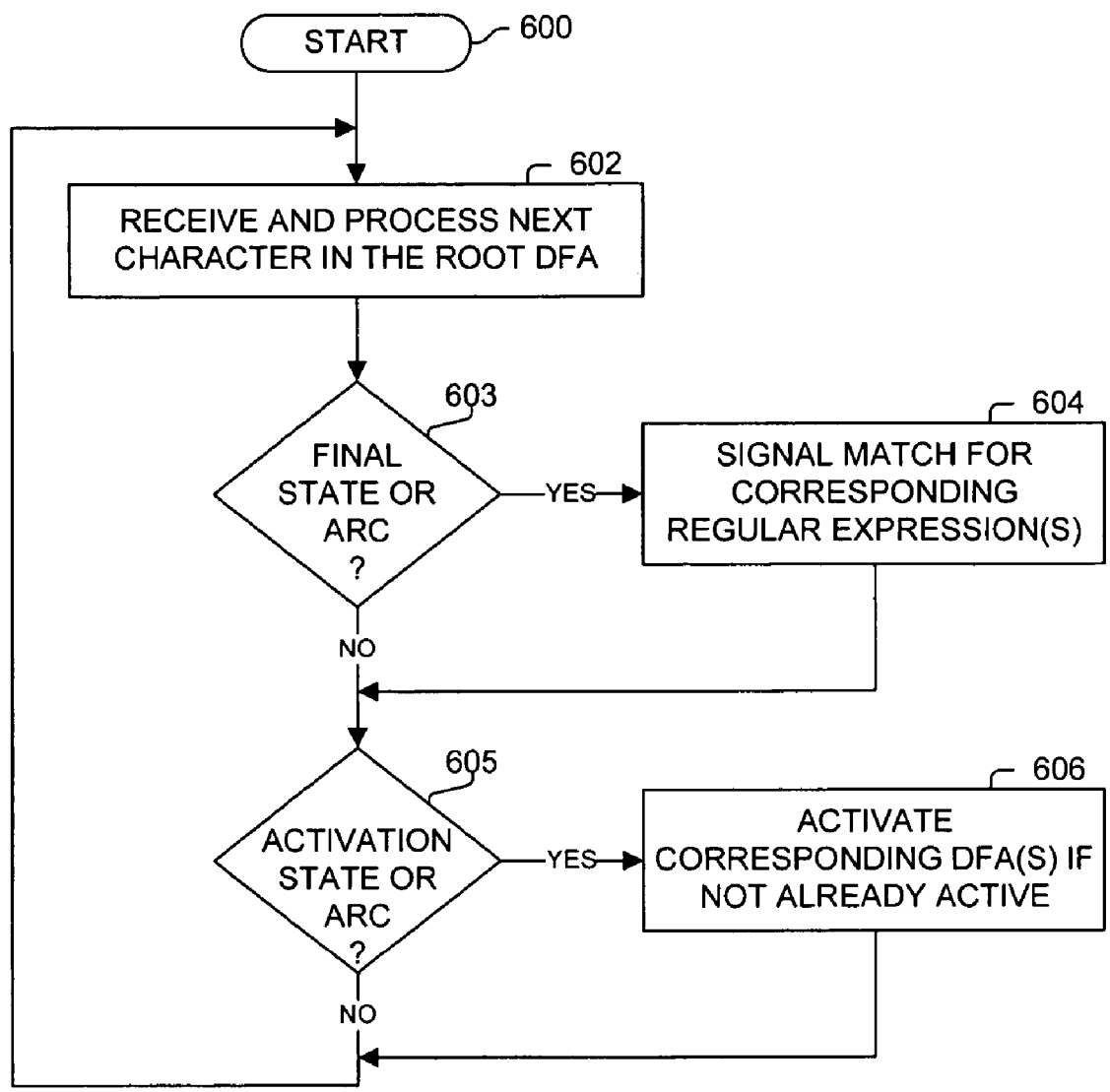
FIGS. 6A-C are flow diagrams illustrating processes used in one embodiment for traversing root, branch, and leaf DFAs.
Figure 6B:
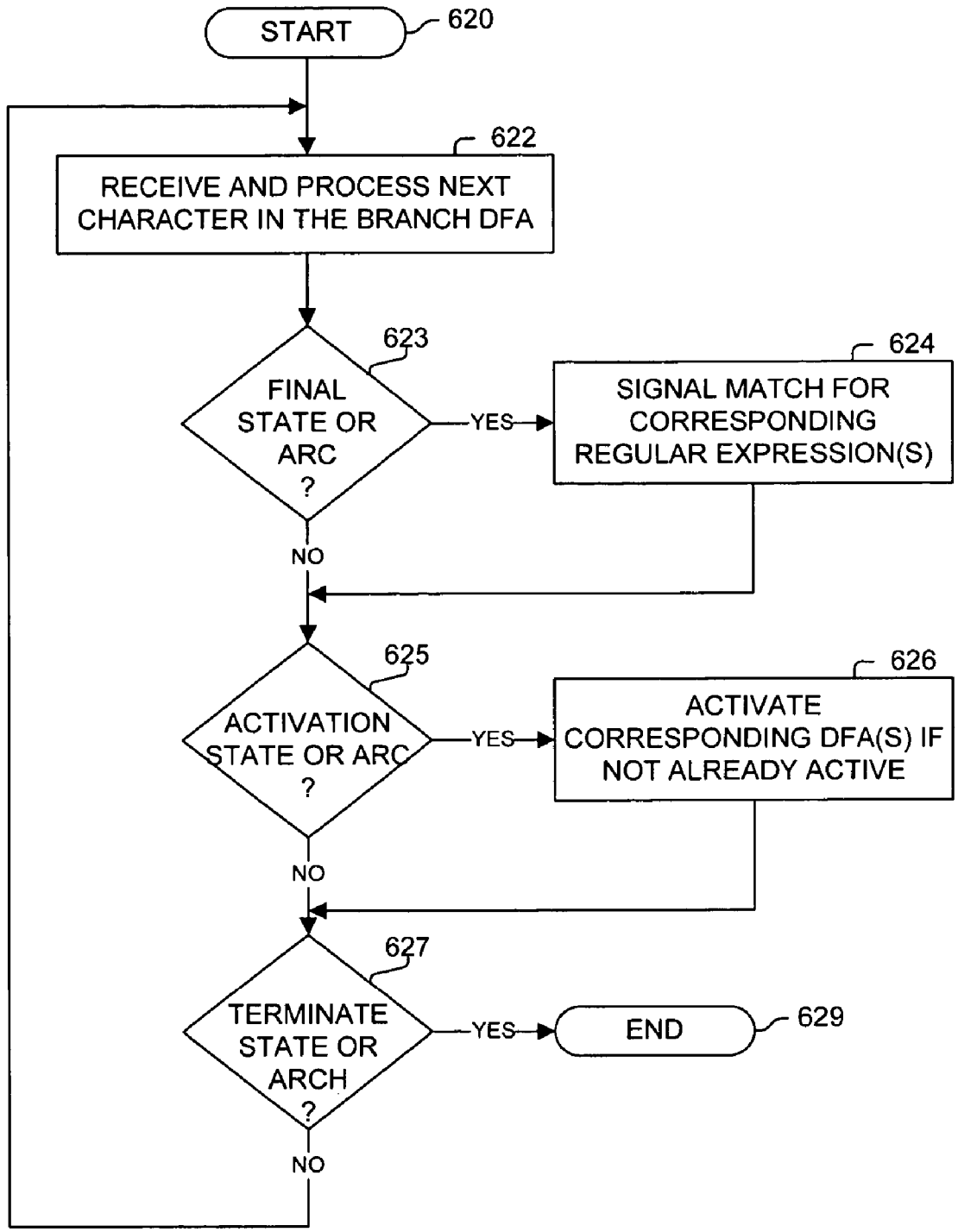
Figure 6C:
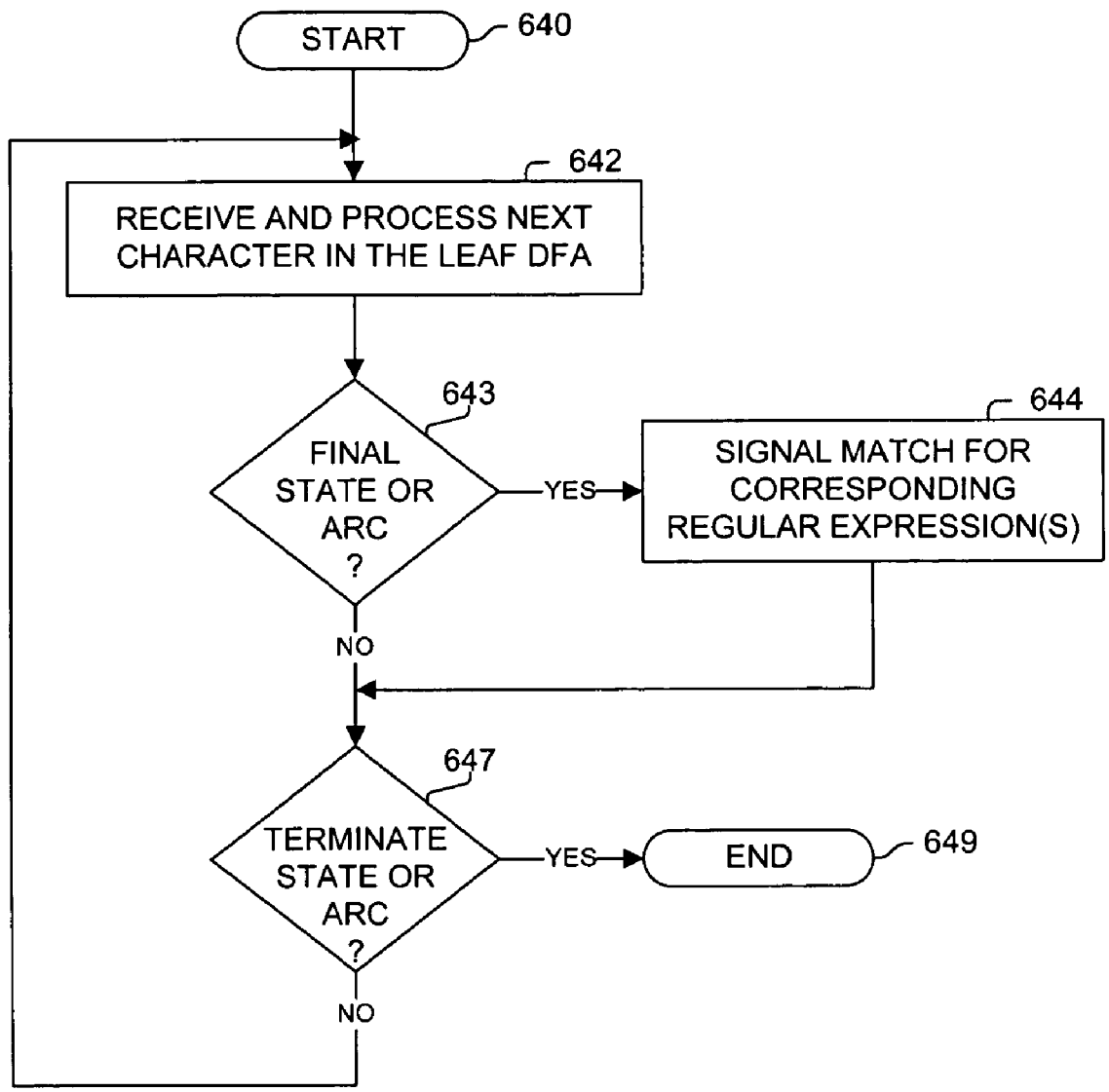

FIGS. 6A-C are flow diagrams illustrating processes used in one embodiment for traversing root, branch, and leaf DFAs. Turning to FIG. 6A, illustrated is a process used in one embodiment for traversing a root DFA. Processing begins with process block 600, and proceeds to process block 602, wherein a character of the input string to be matched is received and processed in the root DFA. As determined in process block 603, if a final arc or state is traversed, then in process block 604, an indication of the matching regular expression(s) is generated. As determined in process block

605, if an activation arc or state is traversed, then in process block 606, the corresponding branch or leaf DFA is activated (in one embodiment always, while in one embodiment only when the corresponding DFA is not already active). Processing returns to process block 602 to receive and process the next input character.

Turning to FIG. 6B, illustrated is a process used in one embodiment for traversing a branch DFA. Processing begins with process block 620, and proceeds to process block 622, wherein a character of the input string to be matched is received and processed in the branch DFA. As determined in process block 623, if a final arc or state is traversed, then in process block 624, an indication of the matching regular expression(s) is generated. As determined in process block 625, if an activation arc or state is traversed, then in process block 626, the corresponding branch or leaf DFA is activated (in one embodiment always, while in one embodiment only when the corresponding DFA is not already active). As determined in process block 627, if a termination (exit) arc or state is traversed, then as indicated by process block 629, this branch DFA becomes inactive. Otherwise, processing returns to process block 622 to receive and process the next input character.

Turning to FIG. 6C, illustrated is a process used in one embodiment for traversing a leaf DFA. Processing begins with process block 640, and proceeds to process block 642, wherein a character of the input string to be matched is received and processed in the branch DFA. As determined in process block 643, if a final arc or state is traversed, then in process block 644, an indication of the matching regular expression(s) is generated. As determined in process block 647, if a termination (exit) arc or state is traversed, then as indicated by process block 649, this branch DFA becomes inactive. Otherwise, processing returns to process block 642 to receive and process the next input character.

Figure 7A:
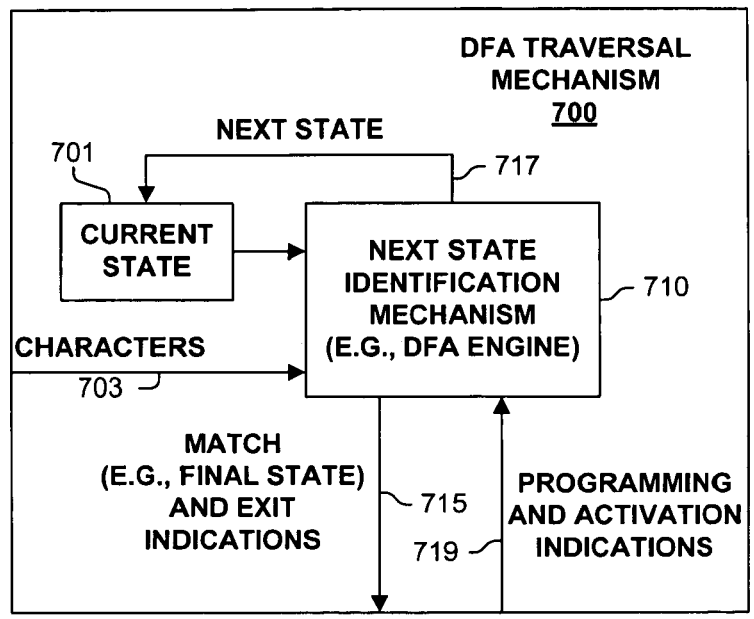
FIG. 7A is a block diagram of a mechanism used one embodiment to traverse DFAs.

FIG. 7A is a block diagram of a DFA traversal mechanism 700 used in one embodiment to traverse one or more DFAs. Matching mechanism 700 includes a DFA state traversal engine 710 used to identify a next state 717 based on its current state 701 and the next input character 703. Additionally, DFA traversal engine 710 produces matching indications 715 in response to traversing a final arc or state. Programming instructions are received via indications 719, which also may provide an activation indication (e.g., to reset to the starting state of the DFA), although this is inferred or included in signal 703.

Figure 7B:
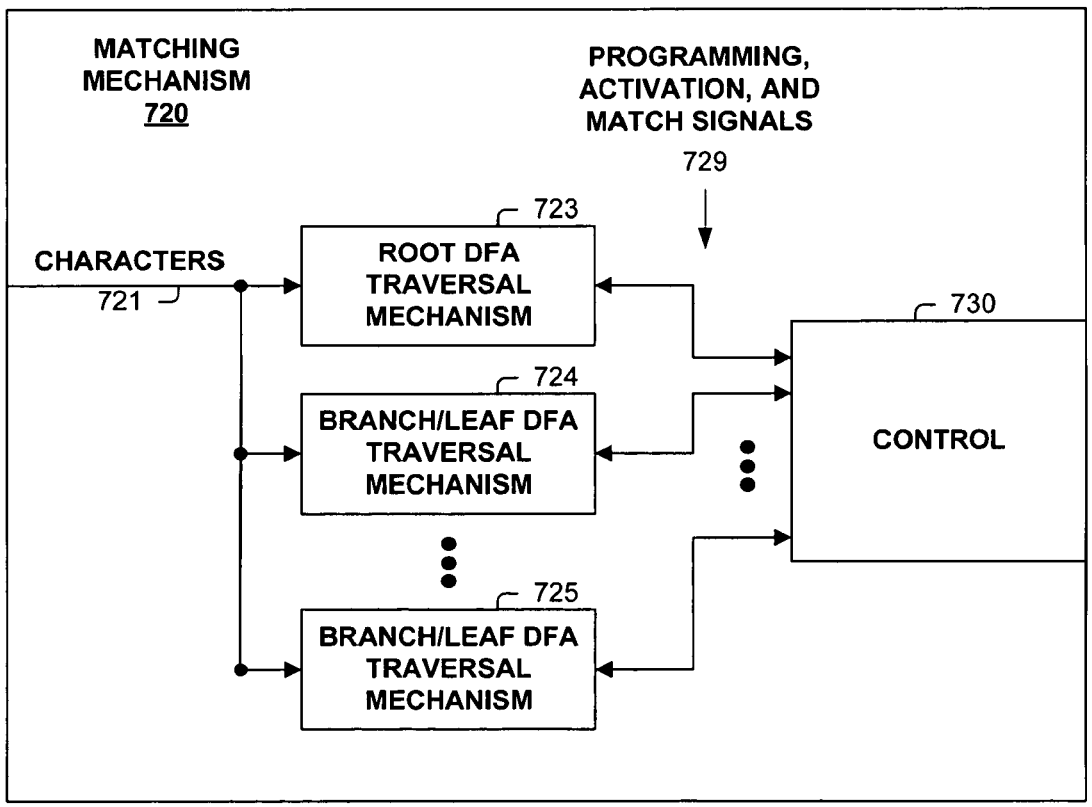
FIG. 7B is a block diagram of a mechanism used one embodiment to traverse DFAs.

FIG. 7B is a block diagram of a matching mechanism 720 used in one embodiment to traverse multiple DFAs in parallel based on an input string of characters 721. Matching mechanism 720 typically requires more hardware than a serial approach, but typically provides a speed advantage over a serial approach. As shown, a root DFA traversal mechanism 723 is used to traverse the root DFA, with other traversal mechanisms 723-725 used for traversing branch DFAs (if any) and leaf DFAs. Control 730, responsive to activation and match signals 729 (as well as providing programming instructions via signals 729), controls the activation of branch/leaf DFA traversal mechanisms 723-725, as well as providing match indications to external devices.

Figure 7C:
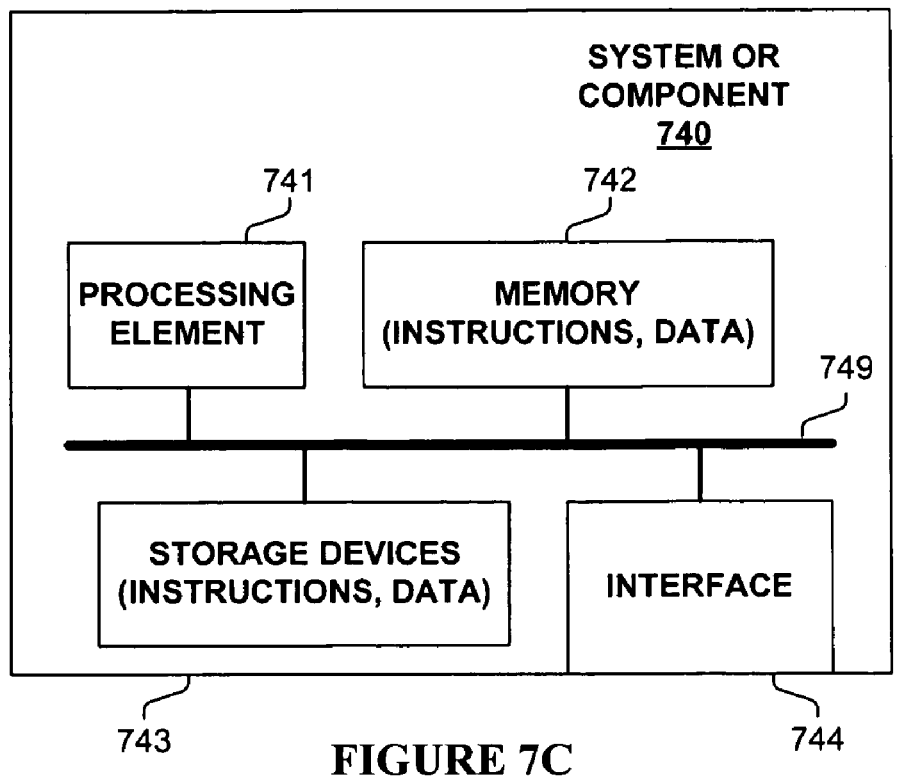
FIG. 7C is a block diagram of a mechanism used one embodiment in traversing and/or producing a hierarchical DFA.

FIG. 7C is a block diagram of a mechanism used in one embodiment in traversing and/or producing a hierarchical DFA. In one embodiment, system 740 includes a processor 741, memory 742, storage devices 743, and interface 744 for communicating with external devices (e.g., for receiving information such as a string of characters to match, the set of regular expressions, or any other information which it needs to receive or send to another device), which are coupled via one or more communications mechanisms 749 (shown as a bus for illustrative purposes).

Various embodiments of system 740 may include more or less elements. The operation of system 740 is typically controlled by processor 741 using memory 742 and storage devices 743 to perform one or more tasks or processes, such as traversing all or a portion of a hierarchical DFA and/or producing one or more DFAs of a hierarchical DFA.

Memory 742 is one type of computer-readable medium, and typically comprises random access memory (RAM), read only memory (ROM), flash memory, integrated circuits, and/or other memory components. Memory 742 typically stores computer-executable instructions to be executed by processor 741 and/or data which is manipulated by processor 741 for implementing functionality in accordance with one embodiment of the invention. Storage devices 743 are another type of computer-readable medium, and typically comprise solid state storage media, disk drives, diskettes, networked services, tape drives, and other storage devices. Storage devices 743 typically store computer-executable instructions to be executed by processor 741 and/or data which is manipulated by processor 741 for implementing functionality in accordance with one embodiment of the invention.

Figure 8:
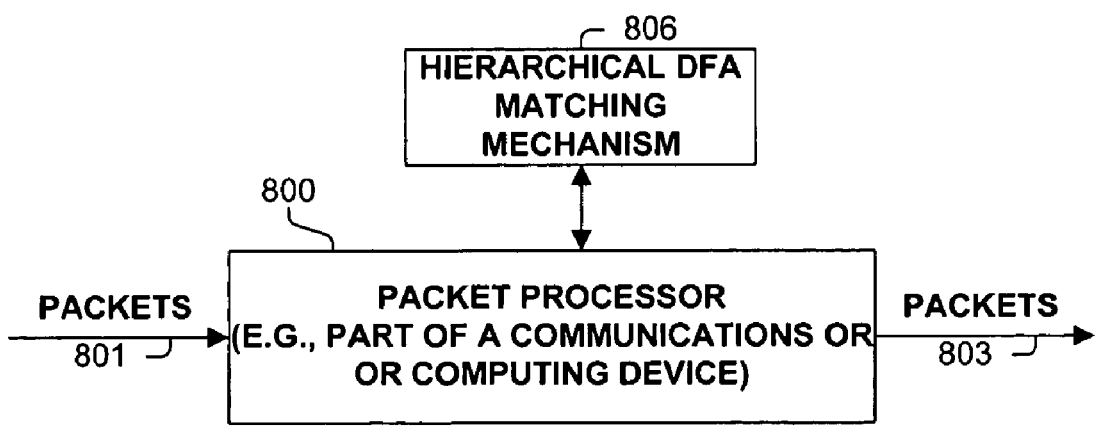
FIG. 8 is a block diagram of one embodiment illustrating the use of a hierarchical DFA in processing packets.

FIG. 8 is a block diagram of one embodiment illustrating the use of a hierarchical DFA in processing packets. As shown, a packet processor 800 receives packets 801, processes these packets, and forwards some or all of these packets out as indicated by packets 803. In one embodiment, packet processor 800 uses a matching mechanism 806, as, for example, a virus or other pattern of interest may have been detected (matched).

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for processing a hierarchical deterministic finite automata (DFA) produced from a plurality of regular expressions, the hierarchical DFA including a root DFA a plurality of leaf DFAs, the apparatus comprising:

means for traversing the hierarchical DFA in response to a sequence of characters and for identifying matches to one or more of said regular expressions;

wherein said means for traversing the hierarchical DFA includes means for traversing the root DFA and for activating said leaf DFAs in response to reaching or traversing corresponding one or more activation states or arcs within the root DFA;

wherein each of said leaf DFAs includes a terminating state or arc; wherein said means for traversing the hierarchical DFA includes means for terminating the traversing of a particular one of said leaf DFAs in response to reaching or traversing a corresponding terminating state or arc in said particular one of said leaf DFAs; wherein at said termination state or arc of at least one of said leaf DFAs causes a corresponding said leaf DFA to become inactive without producing a match with the hierarchical DFA continuing to be processed by said means for traversing the hierarchical DFA.

2. The apparatus of claim 1, wherein the root DFA is always active and each of said leaf DFAs is intermittently active.

3. An apparatus for processing a hierarchical deterministic finite automata (DFA) produced from a plurality of regular expressions, the hierarchical DFA including a root DFA a plurality of leaf DFAs, the apparatus comprising:
   means for traversing the hierarchical DFA in response to a sequence of characters and for identifying matches to one or more of said regular expressions;
   wherein said means for traversing the hierarchical DFA includes means for traversing the root DFA and for activating said leaf DFAs in response to reaching or traversing corresponding one or more activation states or arcs within the root DFA;
   wherein the hierarchical DFA includes one or more branch DFAs; wherein each of said one or more branch DFAs includes an activation state or arc for causing activation of at least one of said leaf DFAs;
   wherein each of said leaf DFAs and said branch DFAs includes a terminating state or arc; wherein said means for traversing the hierarchical DFA includes means for terminating the traversing of a particular one of said leaf DFAs and said branch DFAs in response to a corresponding terminating state or arc being reached or traversed in said particular one of said leaf DFAs and said branch DFAs; wherein at said termination state or arc of at least one of said branch DFAs causes a corresponding said branch DFA to become inactive without producing a match with the hierarchical DFA continuing to be processed by said means for traversing the hierarchical DFA.

4. The apparatus of claim 3, wherein the root DFA is always active and each of said branch DFAs and said leaf DFAs is intermittently active.

5. A method for processing a hierarchical deterministic finite automata (DFA) produced from a plurality of regular expressions, the hierarchical DFA including a root DFA and one or more leaf DFAs, the method comprising:
   processing each character of a string of characters on which to perform matching in the root DFA and in each particular active leaf DFA of said leaf DFAs, said processing including:
   determining a next state; and in response to the next state being a final state or traversing a final arc, indicating a match for the corresponding regular expression of said regular expressions;
   wherein said processing of said each active particular leaf DFA further includes in response to the next state being a terminating state or traversing a terminating arc in said particular leaf DFA, making said particular leaf DFA inactive with said processing of the hierarchical DFA continuing with said matching in the root DFA and in each particular active leaf DFA of said leaf DFAs;
   wherein at least one of said terminating state of said one or more leaf DFAs is not a final state, or at least one of said terminating arc is not a final arc; and
   wherein said processing of the root DFA further includes in response to the next state being an activation state or traversing an activation arc, activating a particular one of said leaf DFAs.

6. The method of claim 5, wherein said activating the particular one of said leaf DFAs is performed only if the particular one is currently inactive.

7. The method of claim 5, including generating the hierarchical DFA, wherein said generating the hierarchical DFA includes: determining the root DFA based on at least one character from the beginning of each of said regular expressions; and determining said leaf DFAs corresponding to portions of said regular expressions following said at least one character and linking each of said leaf DFAs to the root DFA in a manner to identify when to activate said each of said leaf DFAs, said each of said leaf DFAs including at least one final state or arc and at least one termination state or arc.

8. The method of claim 7, wherein within at least one of said leaf DFAs, the final state and the termination state are the same state or the final arc and the terminating arc are the same arc.

9. A method for processing a hierarchical deterministic finite automata (DFA) produced from a plurality of regular expressions, the hierarchical DFA including a root DFA and one or more leaf DFAs, the method comprising:
   generating the hierarchical DFA, including: determining the root DFA based on at least one character from the beginning of each of said regular expressions; and determining said leaf DFAs corresponding to portions of said regular expressions following said at least one character and linking each of said leaf DFAs to the root DFA in a manner to identify when to activate said each of said leaf DFAs, said each of said leaf DFAs including at least one final state or arc and at least one termination state or arc; and
   processing each character of a string of characters on which to perform matching in the root DFA and in each particular active leaf DFA of said leaf DFAs, said processing including: determining a next state; and in response to the next state being a final state or traversing a final arc, indicating a match for the corresponding regular expression of said regular expressions;
   wherein said processing of said each active particular leaf DFA further includes in response to the next state being a terminating state or traversing a terminating arc in said particular leaf DFA, making said particular leaf DFA inactive with said processing of the hierarchical DFA continuing with said matching in the root DFA and in each particular active leaf DFA of said leaf DFAs;
   wherein said processing of the root DFA further includes in response to the next state being an activation state or traversing an activation arc, activating a particular one of said leaf DFAs; and
   wherein within at least one of said leaf DFAs, the final state and the termination state are different states or the final and terminating arcs are different arcs.

10. A method for processing a hierarchical deterministic finite automata (DFA) produced from a plurality of regular expressions, the hierarchical DFA including a root DFA, one or more branch DFAs, and one or more leaf DFAs, the method comprising:
   processing each character of a string of characters on which to perform matching in the root DFA, in each particular active branch DFA of said branch DFAs, and in each particular active leaf DFA of said leaf DFAs, said processing including: determining a next state; and in response to the next state being a final state or traversing a final arc, indicating a match for the corresponding regular expression of said regular expressions;
   wherein said processing of said each active particular leaf DFA further includes in response to the next state being a terminating state or traversing a terminating arc in said particular leaf DFA, making said particular leaf DFA inactive with said processing of the hierarchical DFA continuing with said matching in the root DFA, in each particular active branch DFA of said branch DFAs, and in each particular active leaf DFA of said leaf DFAs;

wherein said processing of said each active particular branch DFA further includes in response to the next state being a terminating state or traversing a terminating arc in said particular branch DFA, making said particular branch DFA inactive with said processing of the hierarchical DFA continuing with said matching in the root DFA, in each particular active branch DFA of said branch DFAs, and in each particular active leaf DFA of said leaf DFAs;

wherein said processing of said each active particular branch DFA further includes in response to the next state being an activation state or traversing an activation arc, activating one of said branch or leaf DFAs;

wherein at least one of terminating state is not a final state, or at least one of said terminating arc is not a final arc; and wherein said processing of the root DFA further includes in response to the next state being an activation state or traversing an activation arc, activating one of said branch or leaf DFAs.

11. The method of claim 10, wherein said activating one of said branch or leaf DFAs is performed only if said one of said branch or leaf DFAs is currently inactive.

12. The method of claim 10, including generating the hierarchical DFA, wherein said generating the hierarchical DFA includes: determining a root DFA based on at least one beginning character from each of said regular expressions; and determining said branch DFAs and said leaf DFAs corresponding to portions of said regular expressions following said at least one beginning character and linking each of said branch DFAs and said leaf DFAs to the root DFA in a manner to identify when to activate said each of said branch DFAs and said leaf DFAs, said each of said branch DFAs and said leaf DFAs including at least one final state or arc, and at least one termination state or arc.

13. The method of claim 12, wherein within at least one of said branch DFAs and said leaf DFAs, the final state and the termination state are the same state, or the final arc and the termination arc are the same arc.

14. A method for processing a hierarchical deterministic finite automata (DFA) produced from a plurality of regular expressions, the hierarchical DFA including a root DFA, one or more branch DFAs, and one or more leaf DFAs, the method comprising:

generating the hierarchical DFA, wherein said generating the hierarchical DFA includes: determining a root DFA based on at least one beginning character from each of said regular expressions; and determining said branch DFAs and said leaf DFAs corresponding to portions of said regular expressions following said at least one beginning character and linking each of said branch DFAs and said leaf DFAs to the root DFA in a manner to identify when to activate said each of said branch DFAs and said leaf DFAs, said each of said branch DFAs and said leaf DFAs including at least one final state or arc, and at least one termination state or arc; and processing each character of a string of characters on which to perform matching in the root DFA, in each particular active branch DFA of said branch DFAs, and in each particular active leaf DFA of said leaf DFAs, said processing including: determining a next state; and in response to the next state being a final state or traversing a final arc, indicating a match for the corresponding regular expression of said regular expressions;

wherein said processing of said each active particular leaf DFA further includes in response to the next state being a terminating state or traversing a terminating arc in said particular leaf DFA, making said particular leaf DFA inactive with said processing of the hierarchical DFA continuing with said matching in the root DFA, in each particular active branch DFA of said branch DFAs, and in each particular active leaf DFA of said leaf DFAs;

wherein said processing of said each active particular branch DFA further includes in response to the next state being a terminating state or traversing a terminating arc in said particular branch DFA, making said particular branch DFA inactive with said processing of the hierarchical DFA continuing with said matching in the root DFA, in each particular active branch DFA of said branch DFAs, and in each particular active leaf DFA of said leaf DFAs;

wherein said processing of said each active particular branch DFA further includes in response to the next state being an activation state or traversing an activation arc, activating one of said branch or leaf DFAs;

wherein said processing of the root DFA further includes in response to the next state being an activation state or traversing an activation arc, activating one of said branch or leaf DFAs; and wherein within at least one of said branch DFAs and said leaf DFAs, the final state and the termination state are different states, or the final arc and the termination arc are different arcs.

15. A method for producing a hierarchical deterministic finite automata (DFA) from a plurality of regular expressions, the method comprising:

determining a root DFA based on at least one beginning character from each of said regular expressions; and determining one or more branch DFAs and one or more leaf DFAs corresponding to one or more characters immediately following said at least one beginning character of at least one of said regular expressions and linking each of said branch DFAs and said leaf DFAs to the root DFA in a manner to identify when to activate said each of said branch DFAs and said leaf DFAs, said each of said branch DFAs and said leaf DFAs including at least one final state and at least one termination state causing the corresponding DFA to become inactive;

wherein one or more of said at least one terminating state is not a final state such that a matching result will not be generated for each terminating state that is not a final state allowing the processing of the hierarchical DFA to continue despite said corresponding DFA becoming inactive.

* * * * *

UNITED STATES PATENT AND TRADEMARK OFFICE
CERTIFICATE OF CORRECTION

| | | |
|---|---|---|
| PATENT NO. | : 7,765,183 B2 | Page 1 of 1 |
| APPLICATION NO. | : 11/113248 | |
| DATED | : July 27, 2010 | |
| INVENTOR(S) | : Williams, Jr. | |

It is certified that error appears in the above-identified patent and that said Letters Patent is hereby corrected as shown below:

Col. 11, line 64, replace "N+MDFA" with -- $N+M$ DFA --

Col. 14, line 30 insert the following text after "processor 800 uses a":
-- matching mechanism 806 to match selected (or all) bytes (typically referred to as characters herein) by traversing a hierarchical DFA programmed in matching mechanism 806. Packet processor 806 is typically responsive to the match result indications generated by --

Signed and Sealed this

Ninth Day of November, 2010

David J. Kappos
*Director of the United States Patent and Trademark Office*